(12) United States Patent
Yano

(10) Patent No.: US 6,727,489 B2
(45) Date of Patent: Apr. 27, 2004

(54) AUTOMATIC IMAGE-QUALITY ADJUSTMENT SYSTEM

(75) Inventor: Seiichirou Yano, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 157 days.

(21) Appl. No.: 09/978,044

(22) Filed: Oct. 17, 2001

(65) Prior Publication Data

US 2002/0153472 A1 Oct. 24, 2002

(30) Foreign Application Priority Data

Apr. 19, 2001 (JP) ........................................ 2001-120564

(51) Int. Cl.[7] .............................................. H01L 27/00
(52) U.S. Cl. ................. 250/221; 250/214 AL; 345/207; 348/744
(58) Field of Search ............................ 250/208.1, 221, 250/214 AL; 348/744, 750, 751, 191, 650, 657, 602, 603, 745, 746, 747; 345/87, 207, 63, 77, 204

(56) References Cited

U.S. PATENT DOCUMENTS 6,239,424 B1 * 5/2001 Kuo ............................ 250/221
6,292,228 B1 * 9/2001 Cho ............................ 348/603

FOREIGN PATENT DOCUMENTS

| JP | A 3-249730 | 11/1991 |
| JP | A 5-153519 | 6/1993 |
| JP | A 5-227497 | 9/1993 |

* cited by examiner

Primary Examiner—Edward J. Glick
Assistant Examiner—Courtney Thomas
(74) Attorney, Agent, or Firm—Birch, Stewart, Kolasch & Birch, LLP

(57) ABSTRACT

An image-quality adjustment system for a liquid-crystal projector detects the brightness and color of ambient light, or detects the brightness and color of the surface onto which the liquid-crystal projector projects an image. The image signal is automatically adjusted according to the detected brightness and color. For example, the brightness, contrast, and color balance of the image signal may be adjusted. The intensity of the lamp in the liquid-crystal projector may also be adjusted. A clear and natural image can thus be projected without the need for manual adjustments.

8 Claims, 4 Drawing Sheets

AUTOMATIC IMAGE-QUALITY ADJUSTMENT SYSTEM

BACKGROUND OF THE INVENTION

The present invention relates to a system that automatically adjusts a liquid-crystal projector according to environmental conditions such as lighting conditions and projection-surface conditions.

Image projection equipment such as liquid-crystal projectors and cathode-ray-tube projectors (referred to below as LCD projectors and CRT projectors, respectively) are used in classrooms and meeting rooms, for example, to project various types of images onto a projection surface such as a screen or a wall. To project a clearly visible image, a CRT projector generally has to be used in a dark or at least a dim environment. LCD projectors, however, are now able to project images bright enough to be seen under a wide range of lighting conditions, including rooms illuminated by fluorescent or incandescent lights.

The quality of the projected image is strongly affected by the brightness and color of the ambient lighting. Image quality is also affected by the brightness (or reflectivity) and color of the surface onto which the image is projected. To project a clear image with natural coloration, it is necessary to adjust the contrast, brightness, and color balance of the image to compensate for these environmental conditions. The color-balance adjustment is often performed as a white-point adjustment or color temperature adjustment. In conventional projection equipment, the adjustments are performed manually.

Since an LCD projector is portable, it tends to be used in environments with many different lighting conditions and many different types of projection surfaces. Each time a conventional LCD projector is brought into a new environment, the user is forced to adjust the projector manually in order to obtain a clear and natural image. Different adjustments are necessary depending on, for example, whether the ambient lighting is fluorescent (which has a bluish cast) or incandescent (which has a reddish cast), and whether the projection surface is a white screen, a white wall surface, or a non-white wall surface.

There is a known technology (disclosed in Japanese Unexamined Patent Publication No. 5-227497, for example) for sensing ambient brightness and adjusting the brightness of the displayed image automatically, but this technology fails to adjust the color balance, and fails to compensate for the color and reflectivity of the projection surface.

Accordingly, even with the above technology, the user of a conventional liquid-crystal projector is faced with the need to make manual adjustments each time the liquid-crystal projector is set up in a new environment. These adjustments are troublesome and take time.

SUMMARY OF THE INVENTION

An object of the present invention is to provide an image-quality adjustment system that automatically adjusts an image projected by an LCD projector according to the brightness and color of ambient light and the brightness and color of the projection surface.

The invented image-quality adjustment system includes a photosensor and a processor, forming part of an LCD projector. The photosensor detects the brightness and color of external light. The processor adjusts an image signal according to the detected brightness and color, preferably adjusting the brightness, contrast, and color balance of the image signal. The LCD projector projects an image according to the adjusted image signal.

The image-quality adjustment system may also include a control circuit that controls the intensity of the lamp in the LCD projector according to the detected brightness.

The external light detected by the photosensor may be ambient light, or light reflected from the surface onto which the image is projected. Alternatively, the image-quality adjustment system may have photosensors for detecting both types of external light.

DETAILED DESCRIPTION OF THE INVENTION

Figure 1:
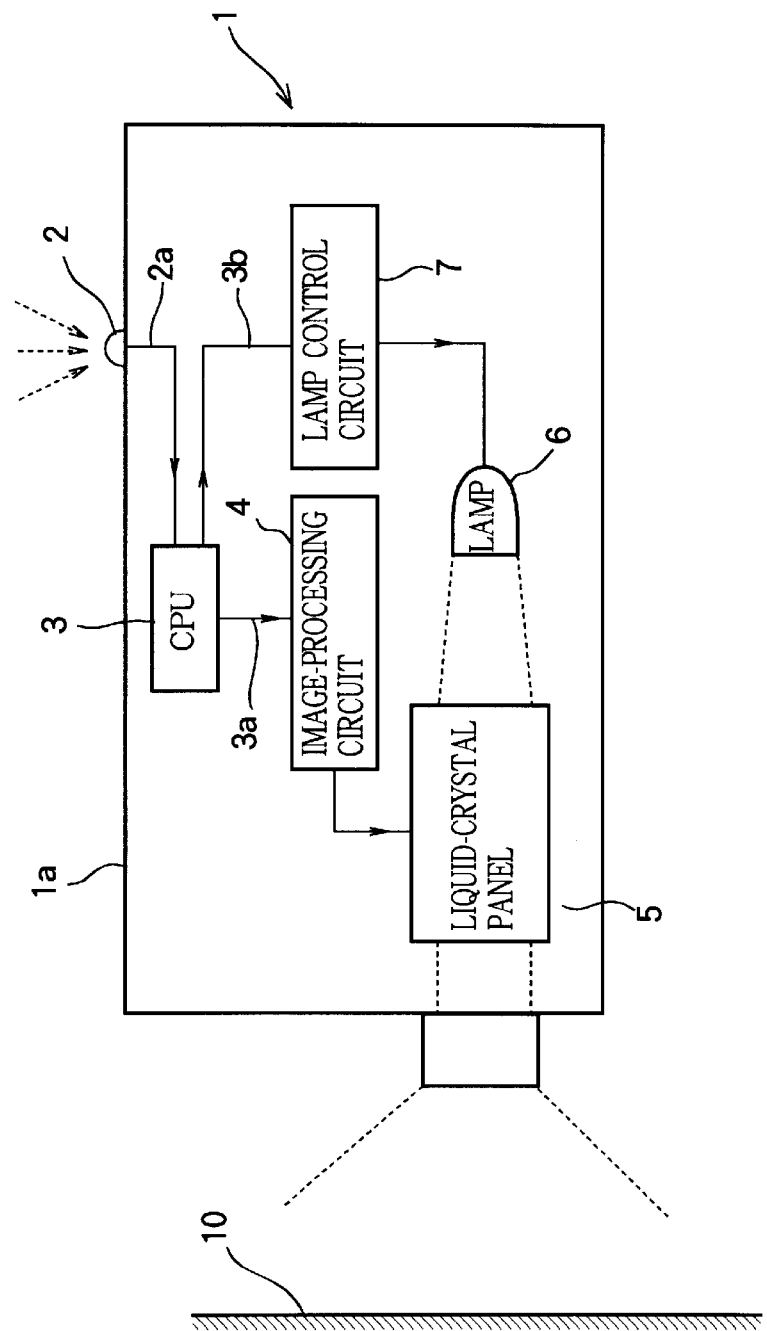
FIG. 1 is a block diagram of an LCD projector embodying the present invention.

Embodiments of the invention will be described with reference to the attached drawings, in which like parts are indicated by like reference characters.

Referring to FIG. 1, the invention can be embodied in an LCD projector 1 comprising a photosensor 2, a central processing unit (CPU) 3, an image-processing circuit 4, a liquid-crystal panel 5, a lamp 6, and a lamp control circuit 7. These elements cooperate to project an image on a projection surface 10 such as a screen or wall; these elements also form the image-quality adjustment system. The CPU 3 receives a photosensor signal 2a from the photosensor 2, supplies an image-adjustment signal 3a to the image-processing circuit 4, and supplies a lamp-adjustment signal 3b to the lamp control circuit 7. These signals enable the image-quality adjustment system to detect the brightness and color of ambient light around the LCD projector 1 and projection surface 10, and adjust such image-quality parameters as the contrast, brightness, and color balance accordingly.

Figure 2A:
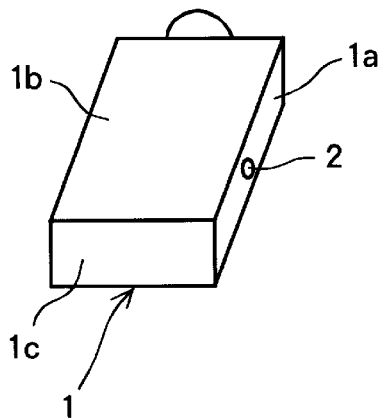
FIGS. 2A, 2B, and 2C are perspective views of the LCD projector in FIG. 1, showing three possible locations for the photosensor.

The photosensor 2 in FIG. 1 is disposed on a side cover 1a of the LCD projector 1, as illustrated in FIG. 2A. The CPU 3, image-processing circuit 4, liquid-crystal panel 5, lamp 6, and lamp control circuit 7 in FIG. 1 are disposed inside the housing of the LCD projector 1.

The photosensor 2 comprises, for example, three photosensing elements, one sensitive to red light, one sensitive to green light, and one sensitive to blue light. In this case, the photosensor signal 2a comprises three separate signals, indicating the strength of the red, green, and blue components of the ambient light.

Figure 2B:
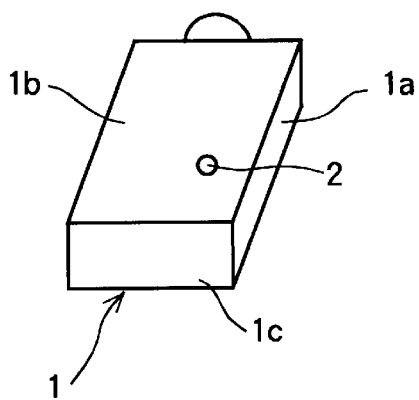
Figure 2C:
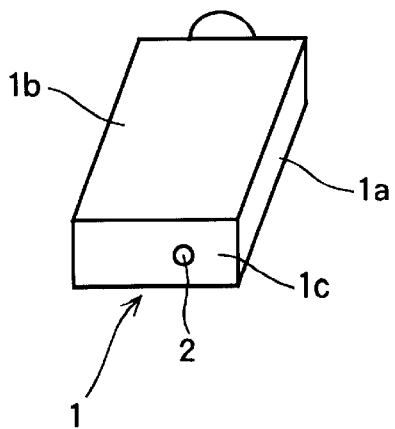

The photosensor 2 does not have to be mounted on the side cover of the LCD projector 1 as shown in FIG. 2A. The photosensor 2 may be mounted on the top cover 1b of the LCD projector 1, as shown in FIG. 2B, or on the back cover 1c of the LCD projector 1, as shown in FIG. 2C. Alternatively, the LCD projector 1 may have three photosensors 2, one mounted on each of the three covers 1a, 1b, 1c shown in FIGS. 2A, 2B, and 2C, each photosensor supplying a separate set of red, blue, and green signals to the CPU 3.

The CPU 3 uses the photosensor signal 2a received from the photosensor or photosensors 2 to determine the brightness and color of the ambient lighting and calculate appropriate image-quality parameters, including brightness, contrast, and color balance, for the projected image. The image-adjustment signal 3a includes information for adjusting all of these parameters. The lamp-adjustment signal 3b includes information for adjusting the brightness of the lamp 6.

The image-processing circuit 4 receives an image signal from a signal source such as a video apparatus or a computer (not visible), and processes the image signal to adjust the brightness, contrast, and color balance of the image according to the image-adjustment signal 3a. The processed signal is supplied to the liquid-crystal panel 5. The lamp control circuit 7 controls the brightness of the lamp 6 according to the lamp-adjustment signal 3b. The light emitted by the lamp 6 is projected through the liquid-crystal panel 5 onto the projection surface 10, thereby projecting an image according to the processed image signal.

If the ambient lighting is comparatively bright, for example, then the CPU 3 preferably increases the brightness of the lamp 6 and increases both the brightness and contrast of the image signal, to make the projected image more clearly visible. If the ambient lighting is comparatively dark, the CPU 3 preferably decreases the brightness of the image signal and dims the lamp 6. If the ambient lighting has a reddish cast, the CPU 3 compensates by reducing the red component of the image signal and increasing the green and blue components, so that the projected image has a natural color balance. Similarly, if the ambient lighting has a bluish cast, the CPU 3 compensates by reducing the blue component of the image signal and increasing the red and green components, once again producing a projected image with a natural color balance.

Accordingly, the LCD projector 1 automatically projects an image with natural colors and appropriate brightness and contrast levels for arbitrary ambient lighting conditions. Compared with a conventional LCD projector, the LCD projector 1 is easier to set up and adjust because the user does not have to make adjustments to compensate for the ambient lighting. Moreover, the LCD projector 1 remains correctly adjusted even if the ambient lighting conditions change while the LCD projector is being used.

Figure 3:
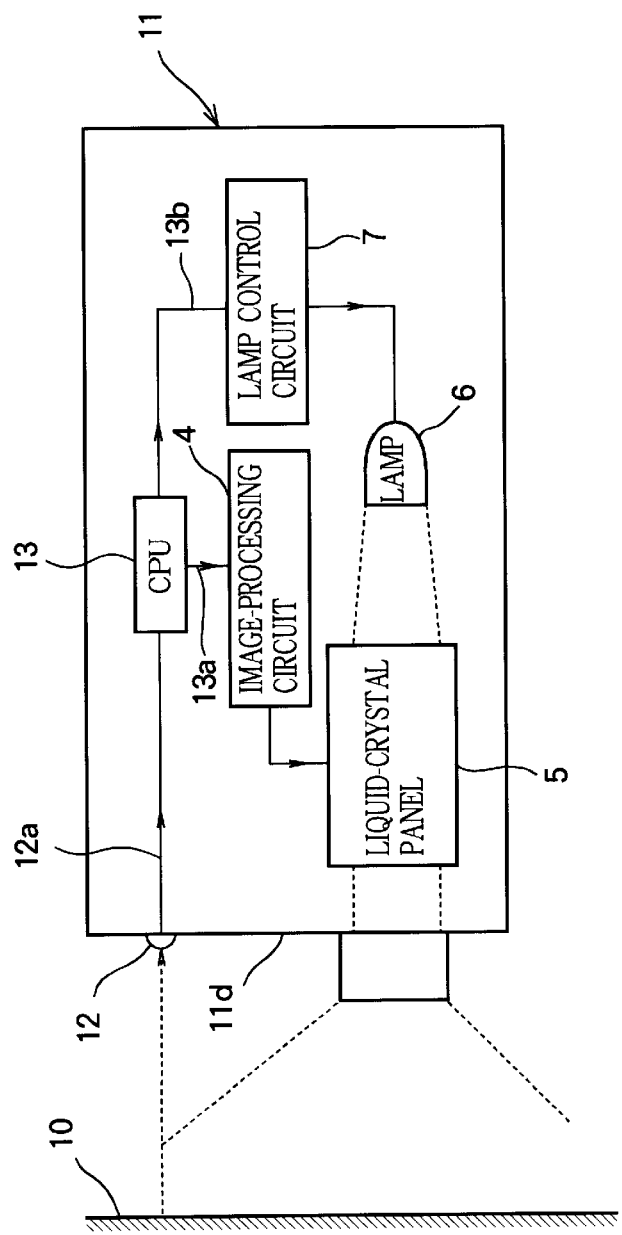
FIG. 3 is a block diagram of another LCD projector embodying the present invention.

The invention can also be embodied in an image-quality adjustment system that compensates for the brightness and color of the projection surface, instead of the brightness and color of the ambient lighting. FIG. 3 shows an image-quality adjustment system of this type. The LCD projector 11 in FIG. 3 comprises an image-processing circuit 4, a liquid-crystal panel 5, a lamp 6, and a lamp control circuit 7 as described above, a photosensor 12 disposed on the front cover 11d of the LCD projector 11, and a CPU 13. The CPU 13 receives a photosensor signal 12a from the photosensor 12, supplies an image-adjustment signal 13a to the image-processing circuit 4, and supplies a lamp-adjustment signal 13b to the lamp control circuit 7. The LCD projector 11 projects an image onto a projection surface 10 such as a screen or a wall.

Figure 4:
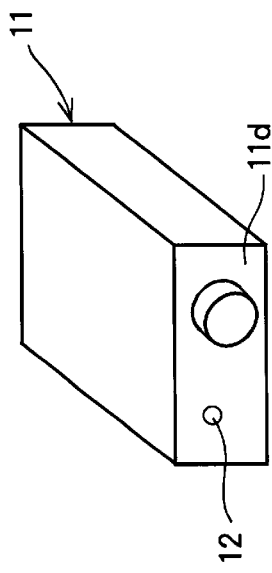
FIG. 4 is a perspective view of the LCD projector in FIG. 3, showing the location of the photosensor.

The photosensor 12, shown more clearly in FIG. 4, is positioned to receive ambient light reflected from the projection surface 10. The photosensor 2 comprises, for example, three photosensing elements, one sensitive to red light, one sensitive to green light, and one sensitive to blue light. In this case, the photosensor signal 12a comprises three separate signals, indicating the strength of the red, green, and blue components of the light reflected from the projection surface 10.

The CPU 13 uses the photosensor signal 12a received from the photosensor 12 to determine the brightness and color of the projection surface 10 and calculate appropriate image-quality parameters, including brightness, contrast, and color balance, for the projected image. The image-adjustment signal 13a includes information for adjusting all of these parameters. The lamp-adjustment signal 13b includes information for adjusting the brightness of the lamp 6. The image-processing circuit 4 and lamp control circuit 7 operate according to these signals as described in the first embodiment. The lamp 6 emits light of an intensity specified by the lamp-adjustment signal 13b, and the liquid-crystal panel 5 operates according to the processed image signal received from the image-processing circuit 4, thereby projecting an image onto the projection surface 10.

The CPU 13 operates in, for example, the same way as in the first embodiment, increasing the brightness of the lamp 6 and increasing both the brightness and contrast of the image signal when a comparatively bright projection surface is detected, reducing the red component of the image signal and increasing the green and blue components if the projection surface is detected to have a reddish color, and so on. The LCD projector 11 can thus project a clear image, with natural colors, onto a wide variety of projection surfaces, not limited to white screens and white walls.

Figure 5:
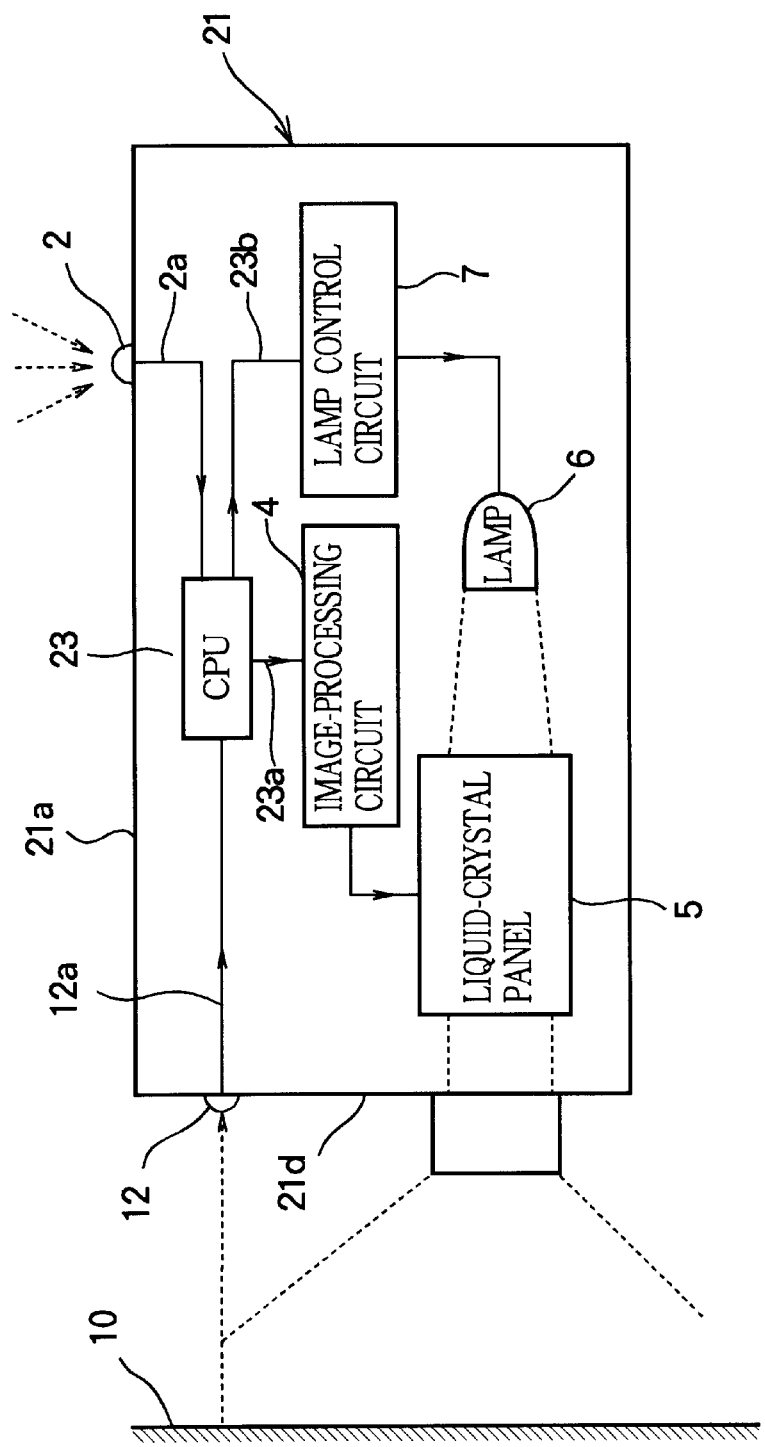
FIG. 5 is a block diagram of another LCD projector embodying the present invention.

A third embodiment, illustrated in FIG. 5, detects and compensates for the brightness and color of both the ambient light and the projection surface. The LCD projector 21 comprises a photosensor 2, an image-processing circuit 4, a liquid-crystal panel 5, a lamp 6, a lamp control circuit 7, and another photosensor 12 as described in the preceding embodiments, and a CPU 23. The CPU 23 receives photosensor signals 2a, 12a from the photosensors 2, 12, supplies an image-adjustment signal 23a to the image-processing circuit 4, and supplies a lamp-adjustment signal 23b to the lamp control circuit 7.

Photosensor 2 may be mounted on a side cover 21a of the housing of the LCD projector 21, as shown in FIGS. 5 and 2A, or on the top cover or back cover, as shown in FIG. 2B or 2C. Photosensor 12 is mounted on the front cover 21d as shown in FIG. 5, in position to receive light reflected from the projection surface 10. Photosensor signal 2a indicates the brightness and color of the ambient light, while photosensor signal 12a indicates the brightness and color of the projection surface 10.

The CPU 23 uses the information provided by both photosensor signals 2a and 12a to calculate appropriate image-quality parameters, including brightness, contrast, and color balance, for the projected image. The image-adjustment signal 13a includes information for adjusting all of these parameters. The lamp-adjustment signal 13b includes information for adjusting the brightness of the lamp 6. The image-processing circuit 4 and lamp control circuit 7 operate according to these signals as described in the first embodiment. The lamp 6 emits light of an intensity specified by the lamp-adjustment signal 13b, and the liquid-crystal panel 5 operates according to the processed image signal received from the image-processing circuit 4, thereby projecting an image onto the projection surface 10.

The CPU 13 operates in, for example, the same way as in the first embodiment, increasing the brightness of the lamp 6 and increasing both the brightness and contrast of the image signal when the combined brightness of the ambient light and projection surface 10 is comparatively high, reducing the red component of the image signal and increasing the green and blue components if the projection surface or the ambient light is detected to have a reddish color, and so on. The LCD projector 11 can thus project a clear image, with natural colors, onto a wide variety of projection surfaces, under a wide variety of ambient lighting conditions.

The control scheme described above may be modified in various ways. For example, photosensor 12 may detect the brightness and color of the projection surface twice: once when the lamp 6 is switched off; and once when the lamp 6 is switched on to a predetermined brightness level and an all-white image is projected.

Those skilled in the art will recognize that further variations are possible within the scope of the invention as claimed below.

What is claimed is:

1. An image-quality adjustment system for a liquid-crystal projector that projects an image onto a surface according to an input image signal, comprising:

at least one photosensor for sensing brightness and color of external light reflected from the surface and received at the liquid-crystal projector; and a processor for adjusting the image signal according to the detected brightness and color.

2. The image-quality adjustment system of claim 1, wherein the processor adjusts brightness, contrast, and color balance of the image signal according to the detected brightness and color.

3. The image-quality adjustment system of claim 1, wherein the liquid-crystal projector has a projection lamp, further comprising a control circuit for controlling an intensity of the lamp according to at least the detected brightness.

4. The image-quality adjustment system of claim 1, further including an additional photosensor that detects the brightness and color of ambient light.

5. A method of adjusting an image projected by a liquid-crystal projector onto a surface according to an input image signal, comprising the steps of:

(a) detecting both brightness and color of external light reflected from the surface and received at the liquid-crystal projector; and (b) adjusting the image signal according to the detected brightness and color.

6. The method of claim 5, wherein said step (b) includes adjusting the image signal in regard to brightness, contrast, and color balance.

7. The method of claim 5, wherein the liquid-crystal projector has a projection lamp, further comprising the step of controlling an intensity of the lamp according to at least the detected brightness.

8. The method of claim 5, wherein said step (a) also detects the brightness and color of ambient light.

\* \* \* \* \*